United States Patent [19]

Olson

[11] 4,437,613
[45] Mar. 20, 1984

[54] PARTICLE SPREADER APPARATUS

[76] Inventor: Floyd V. Olson, Rte. 2, Sherburn, Martin County, Minn. 56171

[21] Appl. No.: 356,886

[22] Filed: Mar. 10, 1982

[51] Int. Cl.³ .................. A01C 17/00; A01F 25/18
[52] U.S. Cl. .................................... 239/688; 239/110; 414/301
[58] Field of Search ............... 239/665, 681, 684, 687, 239/688, 689, 110; 414/160, 187, 205, 206, 300, 301

[56] References Cited

U.S. PATENT DOCUMENTS

| | | | |
|---|---|---|---|
| 1,065,960 | 7/1913 | Murray | 239/688 |
| 1,348,885 | 8/1920 | Laffoon | 222/330 |
| 1,613,988 | 1/1927 | Flack | 239/688 |
| 2,726,089 | 12/1955 | Baker | 239/687 |
| 2,772,032 | 11/1956 | Pattillo | 222/330 |
| 2,775,371 | 12/1956 | Isserlis | 222/168 |
| 2,923,574 | 2/1960 | Fuss et al. | 302/28 |
| 2,945,698 | 7/1960 | Kaller | 275/2 |
| 3,716,167 | 2/1973 | Huntington | 222/63 |

FOREIGN PATENT DOCUMENTS 667765  9/1964  Italy .................................... 239/687

Primary Examiner—John J. Love
Assistant Examiner—Jon Rastello
Attorney, Agent, or Firm—Henderson & Sturm

[57] ABSTRACT

A particle spreading apparatus for use in evenly dispersing particles such as grain upon introduction of such particles within a particle storage bin. The apparatus includes a rotating drum having output ports and output tubes affixed thereto through which the particles must pass to enter the bin. The tubes are of varying lengths and at varying angles to the horizontal plane, thereby encouraging even distribution of the particles throughout the particle storage bin. Each output port opening may be selectively varied.

7 Claims, 5 Drawing Figures

PARTICLE SPREADER APPARATUS

TECHNICAL FIELD

This invention relates generally to particle spreading apparatus.

BACKGROUND ART

Once grain has been harvested, it must usually be dried and stored. Typically, both the drying process and storage will be accomplished with the use of large storage bins designed for that purpose. Such storage bins are often cylindrical in shape and have a conical shaped apex. Both the diameter and height of such storage bins vary over a fairly wide range, thereby satisfying a wide variety of storage capacity needs.

As energy becomes more expensive, the grain processing industry has continued to develop more efficient ways to dry and store grain. Some new methods use natural air as the drying agent. Such are will be forced through the grain by blowers and fans.

Figure 1:
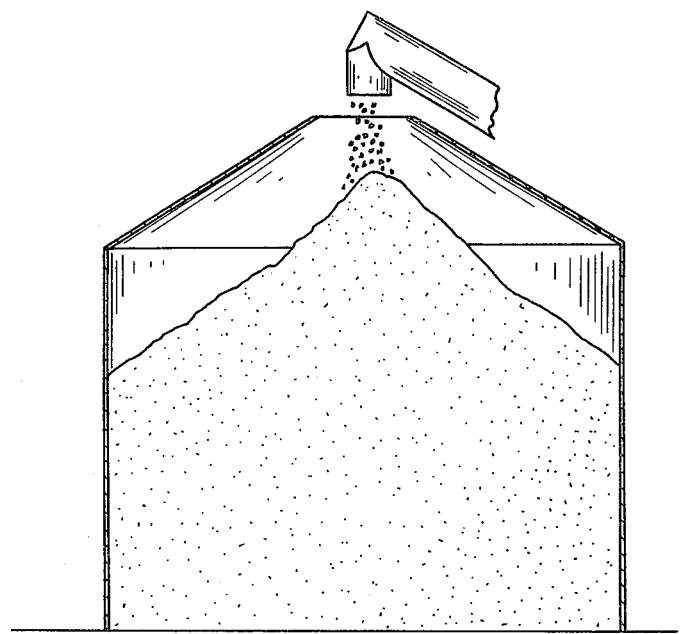

When using the latter process to dry grain, the grain should be substantially evenly distributed throughout the grain storage bin. Unfortunately, as depicted in FIG. 1 of the drawings, grain that has been introduced into a storage bin by standard techniques will not be evenly distributed. Rather, the grain will be much deeper at the center of the bin and more shallow torwards the perimeter of the sotrage area. This may result in uneven and unsatisfactory drying of the grain.

The applicant is not aware of any prior art apparatus that will evenly distribute grain or other small particles in a wide diameter storage bin. Furthermore, most particle spreading apparatus will not even satisfactorily distribute particles in a small diameter bin.

Therefore, there exists a need for a particle spreader apparatus that will ensure an even distribution of particles such as grain inside a storage bin. It would of course be desirable if such an apparatus could be easily manufactured at a reasonable cost.

DISCLOSURE OF INVENTION

The instant invention provides such a particle spreader apparatus. The apparatus includes a particle holding unit that may be rotatably mounted on a mounting unit. The mounting unit may in turn be connected at the apex of a storage bin such that the grain or other particles being introduced into the bin must first enter the particle holding unit.

Figure 2:
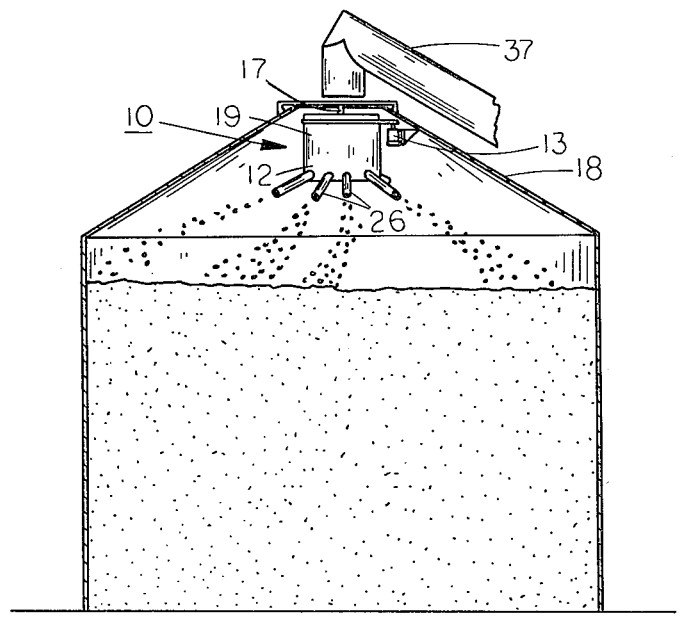
Figure 5:
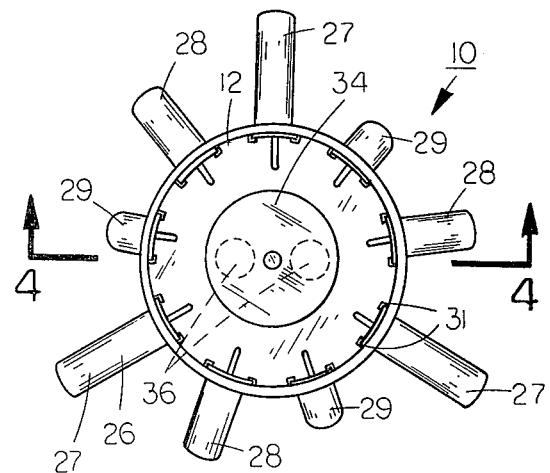

The apparatus also includes a particle dispersal unit for urging particles to exit through the output ports described below. The particle dispersal unit has a drive unit consisting of a variable speed motor that connects by way of a drive belt to the particle holding unit. So connected, the particle holding unit may be selectively rotated about the mounting unit by appropriately controlling the motor.

A plurality of output ports are disposed along the bottom edge of the grain holding unit. In addition, a plurality of output tubes that serve as dispersal guide units are connected to these output ports. Particles may exit from the particle holding unit by passing through the output ports and their associated output tubes. The output tubes serve to support and guide such particles for a preselected distance and at a preselected angle with respect to the horizontal plane.

Each output port is equipped with an adjustable feed gate unit. Consequently, the operator may adjust the size of the opening of each output port, and thereby control how many particles may pass through that opening over a given period of time.

The output tubes include a variety of different lengthed tubes. For instance, some of the tubes may be relatively long, some of the tubes may be of a medium length, and some of the tubes may be short.

In addition, the various tubes may be disposed at differing angles. More particularly, the relatively long tubes may be disposed nearly normal to the horizontal plane. The medium lengthed tubes may be disposed at a somewhat greater angle in a downwards direction. And finally, the short tubes may be disposed at yet a greater angle downwards.

In use, it may be seen that particles may be introduced into the particle holding unit from above. Since the particle holding unit will be rotating through interaction with the drive unit, centrifugal force will cause the particles to seek to exit through the output ports. Such particles must then pass through the various output tubes.

Particles which exit the particle holding unit through the longer and less angularly inclined output tubes will be thrown a farther distance from the center of the storage bin than particles which exit through the medium length tubes. Likewise, particles which exit through the medium length tubes will be thrown a further distance from the center of the storage bin than particles which exit through the shortest length tubes.

In addition, the operator may control distribution of the particles by adjusting the speed of rotation of the particle holding unit, or by adjusting the openings of the output ports by use of the adjustable feed gate units.

By use of this invention as described, an operator may fill a particle storage bin with a substantially even layer of particles.

BRIEF DESCRIPTION OF THE DRAWINGS

These and other attributes of the invention will become more clear upon thoroughly reviewing the following description of the best mode for carrying out the invention, and especially when reviewed in connection with the drawings, wherein:

FIG. 1 is a symbolic representation of a prior art grain storage facility;

FIG. 2 is a symbolic representation of a grain storage bin having the instant invention installed therein;

FIG. 3 is a perspective view of the apparatus;

FIG. 4 is a front elevational sectional view of the apparatus; and

FIG. 5 is a top plan view of the apparatus.

BEST MODE FOR CARRYING OUT THE INVENTION

This invention may be used to evenly distribute particles of various types. The description of the best mode for carrying out the invention, however, will be made with resepct to use of the invention for grain spreading.

Referring now to the drawings and in particular to FIG. 3, the apparatus may be seen as depicted generally by the numeral 10. The apparatus (10) may be comprised generally of a mounting unit (11), a grain holding unit (12), a drive unit (13), a plurality of output units (14), and a plurality of adjustable feed gate units (16) (see FIG. 4). These units will now be described in detail.

The mounting unit (11) may be comprised of a shaft (17). This shaft (17) may then be mounted and affixed to or proximal to a grain storage bin (18) as depicted in FIG. 2.

The grain holding unit (12) includes a cylindrically shaped drum (19) having an open top end that forms an input port (21) for receiving grain from above. The bottom of the drum (19) may be rotatably affixed at its center to the shaft (17) of the mounting unit (11) by use of any suitable prior art bearing means.

The drive unit (13) includes a variable speed motor (22) that attaches to the drum (19) by a drive belt (23). Although a fixed speed motor could be utilized, the applicant has determined that it may be useful during operation to vary the speed of the motor (22) to effectuate a desired dispersion pattern.

Figure 4:
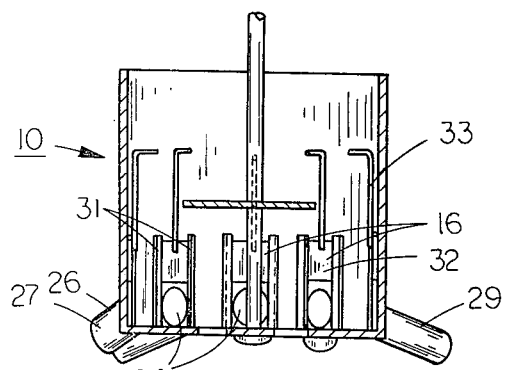
Figure 3:
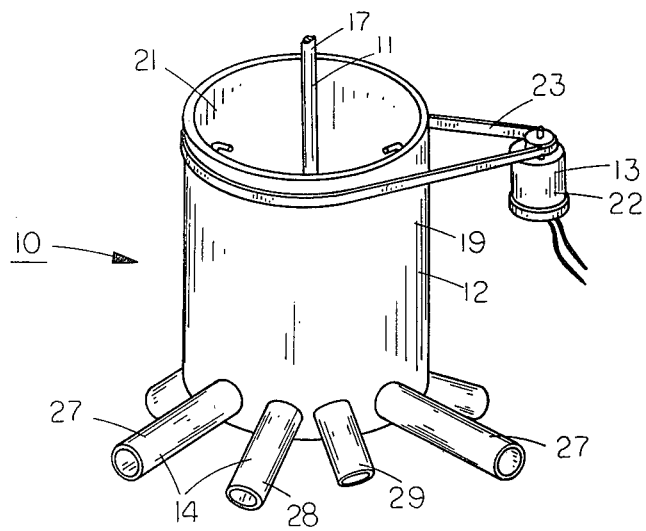

The output units (14) include a plurality of output ports (24) (See FIG. 4) formed through the sides of the drum (19) proximal the bottom thereof. Each such output port (24) connects to an output tube (26) that affixes to the exterior of the drum (19) and depends away therefrom.

As perhaps best depicted in FIG. 5, the output tubes (26) include tubes of different lengths. In this particular embodiment, there are three long tubes (27), three medium length tubes (28) and three short tubes (29).

Referring again to FIGS. 3 and 4, it may also be seen that the output tubes are disposed at different angles with respect to the horizontal plane. More particularly, the long tubes (27) are disposed substantially parallel to the horizontal plane, although inclined downwardly a small bit. The medium length tubes (28) are disposed at a greater downward angle than the longer lengthed tubes (27). Finally, the short tubes (29) are disposed at an even greater angle downwardly than are the medium length tubes (28).

The purpose of this output tube arrangement will be made more clear below.

With reference to FIG. 4, the adjustable feed gate units (16) will now be described. A pair of gate guide members (31) are disposed on either side of each output port (24) on the interior side of the rotatable drum (19). As shown in FIG. 5, each gate guide member (31) has an L-shaped profile.

Each adjustable feed gate unit (16) also includes a gate (32) slidably disposable within the gate guide members (31). Finally, each gate (32) has a handle (33) affixed to it. So configured, an operator may grasp the handle (33) and move the gate (32) within the gate guide members (31) to partially close or fully close any selected output port (24). The purpose of this arrangement will also be made more clear below.

Referring now to FIG. 5, it may be seen that a deflection shield (34) may be attached to the shaft (17) of the mounting unit (11) such that the deflection shield (34) is disposed within the grain holding unit (12). Underneath the deflection shield (34) and disposed through the bottom of the rotating drum (19) are two drain ports (36). The funtion of these elements will also be made clear further below.

The operation and use of the apparatus (10) may now be described.

With reference to FIG. 2, the apparatus (10) may be installed at the apex of a grain storage bin (18) such that grain entering from a grain conveyor (37) must first enter the gain holding unit (12). Since the drive unit (13) will be causing the grain holding unit to rotate about the mounting unit (11), the grain will be urged towards the sides of the rotating drum (19). Such grain may then exit through the output ports (24) and through the tubes (26) associated with each output port (24).

As should now be clear, grain that moves through the longer length tubes (27) will be thrown the farthest away from the center of the grain storage bin (18). This result is necessitated by the longer length of the tube (27) and by the small downward angle.

Similarly, grain that exits through the medium length tubes (28) will be dispersed at an intermediate distance from the center of the grain storage bin (18). Finally, grain that exits through the shortest output tubes (29) will be deposited fairly close to the center area of the grain storage bin (18).

As a result, grain will be fairly evenly distributed throughout the grain storage bin (18). Depending upon the size of the grain storage bin, and upon how fast grain is being introduced into the grain holding unit (12), the operator may control the distribution by varying the speed of rotating the grain holding unit (12) and also be using the adjustable feed gate units (16) to limit the amount of grain that may pass through a particular output port (24).

When the operator has finished introducing grain into the grain holding unit (12), grain will shortly thereafter stop exiting through the output ports (24). At this time, the operator should turn off the drive unit (13). Since there will usually be a small amount of grain left in the grain holding unit (12), the applicant has provided drain ports (36) at the bottom of the grain holding unit (12) so that such remaining grain may be deposited into the grain storage bin (18).

These drain ports (36) are for use only in draining the grain holding unit (12) when the grain holding unit (12) has stopped rotation. Therefore, the deflection shield (34) has been provided so that grain entering the grain holding unit (12) during operation of the apparatus (10) will be deflected away from the drain ports (36) and towards the output ports (24).

Obviously, many modifications and variations of the present invention are possible in light of the above teachings. It is therefore to be understood that, within the scope of the appended Claims, the invention may be practiced otherwise than as specifically described.

I claim:

1. A particle spreader apparatus for use in the equal distribution of particles, the apparatus comprising:

(a) particle holding means for receiving particles that are to be distributed;

(b) output means operably associated with said particle holding means for allowing particles in said particle holding means to exit therefrom;

(c) particle dispersal means for urging particles to exit from said particle holding means through said output means;

(d) dispersal guide means operably associated with said output means for supporting and guiding particles that have exited through said output means for a preselected distance from said output means before dispersing such particles;

(e) drain means operably associated with said particle holding means for allowing particles to exit from said particle holding means through said drain means when said particle dispersal means is not urging said particles to exit through said output means; and (f) deflection means for urging particles away from said drain means when said particle dispersal means is urging particles to exit through said output means.

2. A particle spreader apparatus for use in the equal distribution of particles, the apparatus comprising:
   (a) particle holding means for receiving particles that are to be distributed;
   (b) output means operably associated with said particle holding means for allowing particles in said particle holding means to exit therefrom;
   (c) particle dispersal means for selectively urging particles to exit said particle holding means through said output means;
   (d) dispersal guide means operably associated with said output means for supporting and guiding at a preselected angle particles that have exited through said output means before dispersing such particles;
   (e) drain means operably associated with said particle holding means for allowing particles to exit from said particle holding means through said drain means when said particle dispersal means is not urging such particles to exit through said output means; and
   (f) deflection means for urging particles away from said drain means when said particle dispersal means is urging particles to exit through said output means.

3. A particle spreader apparatus for use in the equal distribution of particles, the apparatus comprising:
   (a) particle holding means for receiving particles that are to be distributed;
   (b) output means operably associated with said particle holding means for allowing particles in said particle holding means to exit therefrom;
   (c) particle dispersal means for selectively urging particles to exit said particle holding means through said output means;
   (d) dispersal guide means operably associated with said output means for supporting and guiding particles that have exited through said output means for a preselected distance from said output means and at a preselected angle before dispersing such particles;
   (e) drain means operably associated with said particle holding means for allowing particles to exit from said particle holding means through said drain means when said particle dispersal means is not urging such particles to exit through said output means; and
   (f) deflection means for urging particles away from said drain means when said particle dispersal means is urging particles to exit through said output means.

4. The apparatus of claims 1, 2 or 3 wherein said output means includes a plurality of output ports disposed through said particle holding means.

5. The apparatus of claim 4 wherein said output tubes include some tubes that are longer than other of said output tubes.

6. The apparatus of claim 4 wherein said output tubes include some tubes that are disposed at differing angles with respect to a horizontal plane than are other of said output tubes.

7. The apparatus of claim 4 and further including adjustable feed gate means for selectively varying the size of said output ports.

* * * * *